1,758,705

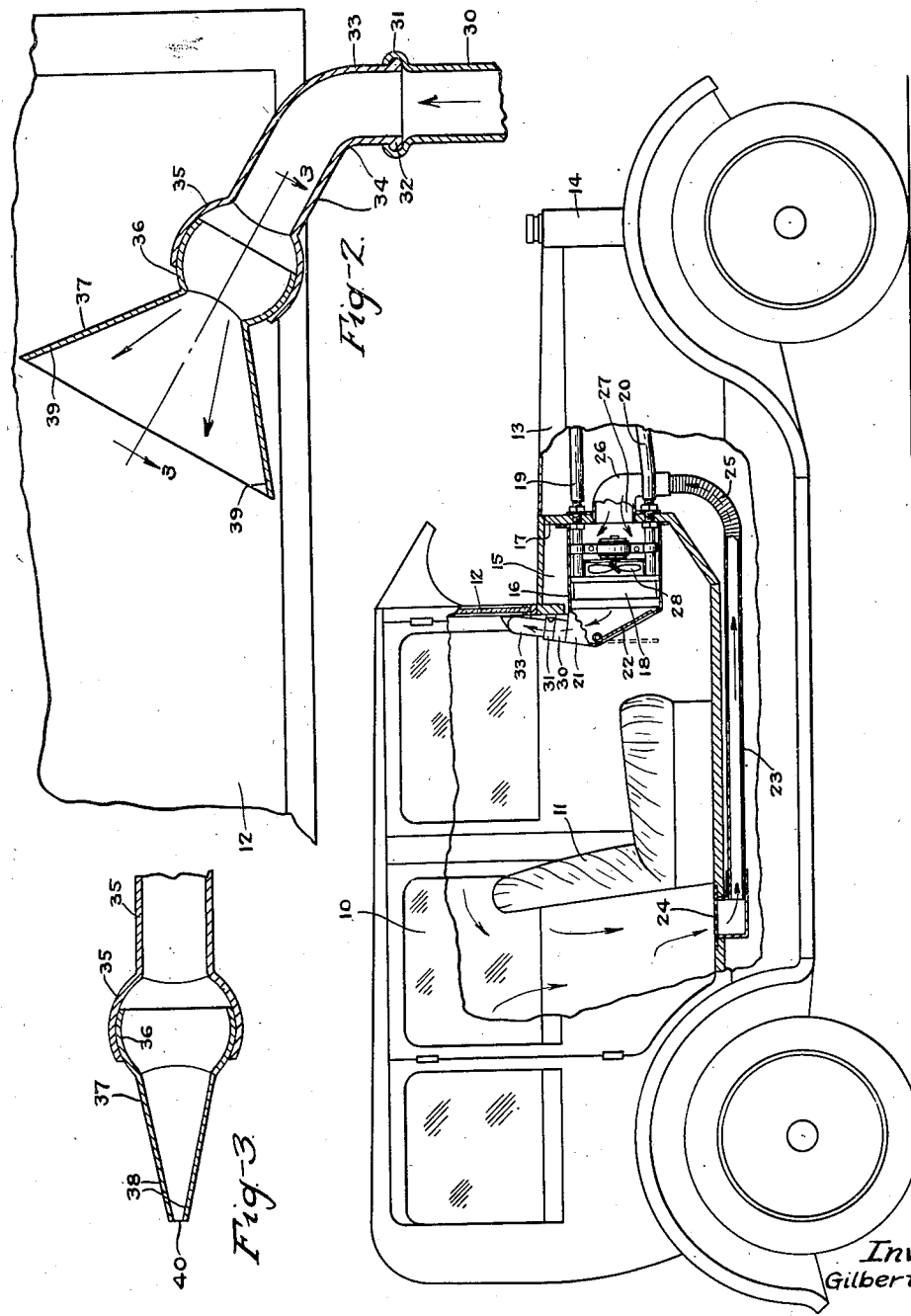
May 13, 1930.  G. P. KEAN  1,758,705
MEANS FOR CIRCULATING HEATED AIR IN THE
CLOSED BODIES OF AUTOMOBILES
Filed Feb. 14, 1929
Inventor:
Gilbert P. Kean Patented May 13, 1930

UNITED STATES PATENT OFFICE

GILBERT P. KEAN, OF MINNEAPOLIS, MINNESOTA, ASSIGNOR OF ONE-FOURTH TO ABBOTT L. FLETCHER AND ONE-FOURTH TO PAUL J. THOMPSON, BOTH OF MINNEAPOLIS, MINNESOTA

MEANS FOR CIRCULATING HEATED AIR IN THE CLOSED BODIES OF AUTOMOBILES

Application filed February 14, 1929. Serial No. 339,842.

My invention relates to means for circulating heated air into closed bodies of automobiles and for causing it to impinge upon the windshield of the automobile to keep the same clear of frost or fog. It is a particular object of my invention to provide a closed box at the front of the car within the tonneau, together with means for discharging from said box heated air and for directing the heated air after it leaves the box upwardly toward the front of the car, and against any portion of the windshield, as may be desired. The air may be heated before leaving the box in any well-known way. An efficient method is to provide a radiator within the box which radiator is heated by means of a hot fluid circulating therethrough, as, for example, the liquid of the automobile cooling system or the exhaust gases of the engine, with a fan back of the radiator for driving air therethrough. Or the air may be heated by contact with pipes extending from the exhaust of the motor before the same enters the box and be driven by the fan. However, the air is heated, it will be drawn by the fan from the interior of the tonneau back of the front seat and caused to flow through the box and to the directing means by the fan.

The use of a radiator within the tonneau and of a fan back of it is well-known. Such a construction is effective for transferring heat into the body of the tonneau. But in practice it has proved unsatisfactory, since the circulation of the heated air is principally in front of the front seat, resulting in making it uncomfortably warm for those who sit in the front seat and getting little or no heat into the back of the automobile, in fact practically none at all in the bottom portion of the back behind the front seat. The result has been that in the use of this type of heating device those in the front of the automobile have been kept uncomfortably warm while those in the back seat have found it difficult to keep from freezing. My invention entirely obviates this objection by creating circulation from the back of the car. Moreover, my invention has the effect of directing the fan-controlled heated air across the surface of the windshield with the result that it is kept sufficiently warm so that no frost or fog to obscure the vision will be formed thereon.

The full objects and advantages of my invention will appear in connection with the detailed description thereof, and the novel features of the invention are particularly pointed out in the appended claims.

In the drawings illustrating an application of my invention,—

Fig. 1 is an elevation diagram view of an automobile with some parts broken away and in section. Fig. 2 is an enlarged sectional view of the adjustable blower device. Fig. 3 is a sectional view on line 3—3 of Fig. 2 viewed in the direction of the arrows.

The tonneau of the automobile is indicated generally at 10, the front seat at 11, the windshield at 12, the hood at 13 and the radiator at 14. Within the front of the tonneau in front of the front seat there is normally a space 15. In this space 15 I provide a closed box 16 adapted to be secured upon the front end wall 17 immediately adjacent the hood. Within the box 16 is a radiator 18 of any approved design which may be heated in any desired way, as, for example, by pipes 19 and 20 connected with the water circulating system of the automobile which carries the fluid through the automobile radiator 14. Or the radiator may be heated by exhaust gases of combustion from the motor (not shown) in a well-known way. Or the radiator in the box may be dispensed with and the air heated by extending through the air-intake pipe hereinafter described the exhaust pipe of the motor (not shown) so that the air will be caused to flow along the hot exhaust pipe before entering the box. The front wall 17, preferably forms the rear wall of the closed box 16. The front wall will be formed by a casing 21 of suitable shape, preferably provided with a door 22 which may be open to permit warm air to be driven into the bottom of the front of the tonneau 10. An air pipe 23 of suitable diameter will be connected through a register 24 with the interior of the tonneau back of the front seat 11, as clearly shown in Fig. 1. This pipe will be carried through a curved member 25 and a hood device 26 through an aperture 27 in the front wall 17 into the closed box back of a fan 28 which, in turn, is back of the radiator 18.

The front closure 21 of the box 16 is provided with a substantially vertical pipe 30 formed with an outwardly-turned annular joint 31. Seated within this joint 31 is an expanded portion 32 of a pipe section 33 angularly disposed at 34 to the direction of the pipe 30. The member 34 is formed with a female member 35 adapted to receive the male portion 36 of a ball-and-socket joint, said portion 36 being connected with a nozzle 37 which tapers inwardly, as indicated at 38 in Fig. 3, and which expands outwardly as indicated at 39 in Fig. 2, this giving an elongated narrow discharge opening 40 for directing the air driven through the device from the fan 28.

By this means the direction and flow of the heated air may be controlled at will. It may be caused to flow along the windshield at various angles, whereby the windshield will be heated on the inside so as to prevent the formation of frost or fog, or it may be swung around to direct the current of air upwardly either between the passengers in the front seat or at one side of one of them so as to carry the heated air toward the back of the car.

The advantages of this construction will be apparent. In the first place, a thoroughly practical and easily controlled means of heating the windshield so as to keep it free from frost and fog is provided. The air is delivered under positive pressure and may be caused to impinge with any desired degree of insistence, with the result that the windshield will be perfectly swept thereby and maintained free from frost or fog. In the second place, the air that is heated always will be drawn from the back part of the tonneau behind the front seat, thus insuring circulation of the air throughout the interior of the tonneau and uniform heating of front and rear. The door 22 permits, where that is desirable, a portion of the heat to be thrown down upon the floor at the front of the automobile. Ordinarily this is not required, since the heat of the engine is usually sufficient to warm the lower part of the front of the car.

I claim:

1. Means for heating the interior of automobiles comprising a closed box in the front of said automobile adjacent the hood, a radiator in said box, a fan in the box back of the radiator, means for causing air to be taken from the rear part of the automobile and introduced into the box, and means for directing the flow of air driven through the radiator by the fan against the windshield of the automobile.

2. Means for heating the interior of automobiles comprising a closed box, a radiator in said box, a fan in the box back of the radiator, an air pipe extending below the floor of the tonneau and communicating with the interior of the automobile back of the front seat and with said box back of the fan and means for directing the flow of air driven through the radiator by the fan against the windshield of the automobile.

3. Means for heating the interior of automobiles comprising an air-circulating system having an inlet end connected with the interior of the tonneau back of the front seat and having an air discharge toward the front of the automobile at the other end, said system being closed between said inlet and discharge and having positioned therein a radiator and a fan, and means for adjusting the discharge end of the system to direct the air upwardly against the windshield of the automobile.

In testimony whereof I hereunto affix my signature.

GILBERT P. KEAN.